(12) United States Patent
Sakagami et al.

(10) Patent No.: US 8,059,356 B2
(45) Date of Patent: Nov. 15, 2011

(54) DISK DRIVE AND METHOD FOR HEAD SERVO CONTROL OF THE DISK DRIVE

(75) Inventors: Chikako Sakagami, Kanagawa (JP); Kazuhisa Shishida, Kanagawa (JP); Isao Yoneda, Kanagawa (JP); Kazuaki Usui, Kanagawa (JP); Hiroshi Uchida, Kanagawa (JP); Takeshi Saito, Kanagawa (JP); Kenji Tomida, Kanagawa (JP); Takenori Atsumi, Ibaraki-ken (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/631,729

(22) Filed: Dec. 4, 2009

(65) Prior Publication Data

US 2010/0142082 A1 Jun. 10, 2010

(30) Foreign Application Priority Data

Dec. 4, 2008 (JP) ................ 2008-310335

(51) Int. Cl.
*G11B 21/02* (2006.01)
(52) U.S. Cl. ...................................... 360/75

(58) Field of Classification Search .................. None
See application file for complete search history.

(56) References Cited

U.S. PATENT DOCUMENTS

| 5,321,559 | A  | * | 6/1994  | Nguyen et al. ............... 360/46 |
| 6,487,028 | B1 | * | 11/2002 | Sri-Jayantha et al. .......... 360/25 |
| 6,549,349 | B2 | * | 4/2003  | Sri-Jayantha et al. .......... 360/31 |
| 7,268,968 | B2 | * | 9/2007  | Semba et al. ............. 360/77.02 |
| 7,345,841 | B2 | * | 3/2008  | Baugh et al. ................. 360/75 |
| 7,564,644 | B2 | * | 7/2009  | Kim et al. ................ 360/78.14 |
| 2008/0297942 | A1 |   | 12/2008 | Usui et al. |

* cited by examiner

*Primary Examiner* — K. Wong (57) ABSTRACT

A disk drive. The disk drive includes a head, a moving mechanism, a first peak filter, an adaptive peak filter, and a filter controller. The head is configured to read servo data on a disk at sampling frequency. The moving mechanism is configured to move the head in proximity with a recording surface of the disk. The first peak filter has a fixed peak frequency and a variable gain, and is configured to be inserted into a servo loop. The servo loop is configured to position the head with position error signals between servo data read by the head and a target position. The adaptive peak filter has a variable peak frequency and a variable gain, and is configured to be inserted into the servo loop. The filter controller is configured to control the gain of the adaptive peak filter according to the gain of the first peak filter.

15 Claims, 8 Drawing Sheets

DISK DRIVE AND METHOD FOR HEAD SERVO CONTROL OF THE DISK DRIVE

CROSS-REFERENCE TO RELATED APPLICATION

This application claims priority from the Japanese Patent Application No. 2008-310335, filed Dec. 4, 2008, the disclosure of which is incorporated herein in its entirety by reference.

TECHNICAL FIELD

Embodiments of the present invention relate to a disk drive and a head servo control method, and in particular, relates to control of a plurality of peak filters in head servo control.

BACKGROUND

Disk drives using various kinds of disks, such as optical disks, magneto-optical disks, flexible magnetic-recording disks and similar data-storage disks are known in the art. In particular, hard-disk drives (HDDs) have been widely used as indispensable data-storage devices for contemporary computer systems. Moreover, HDDs have found widespread application to motion picture recording and reproducing apparatuses, car navigation systems, cellular phones, removable memories used in digital cameras and similar devices, in addition to the computers, because of their outstanding data-storage characteristics.

Magnetic-recording disks used in an HDD include multiple concentric data tracks and multiple servo sectors disposed discretely in the circumferential direction of each magnetic-recording disk. User data are recorded in units of data sectors and data sectors are recorded between servo sectors. A rotary actuator moves a head-slider in proximity to the recording surface of a spinning magnetic-recording disk. A magnetic-recording head of a head-slider accesses designated data sectors in accordance with positional data indicated by servo sectors to write data to, and read data from, the data sectors.

Higher recording density of a HDD is attended by larger storage capacity; and, servo track density increases with data track density. Thus, servo control of a magnetic-recording head in a HDD is more susceptible to external vibrations. External vibrations could cause a reduction in positional control accuracy, a reduction in performance and data corruption. A method to increase the vibration resistance of servo control is to increase the servo sampling frequency. However, processing power increases with increasing servo sampling frequency. Additionally, since many resonance modes exist at high frequencies, the servo frequency has become difficult to increase.

Engineers and scientists engaged in HDD manufacturing and development are interested in the methods and systems for servo writing HDDs that meet the rising demands of the marketplace for increased data-storage capacity, performance, and reliability.

SUMMARY

Embodiments of the present invention include a disk drive. The disk drive includes a head, a moving mechanism, a first peak filter, an adaptive peak filter, and a filter controller. The head is configured to read servo data on a disk at sampling frequency. The moving mechanism is configured to hold and to move the head in proximity with a recording surface of the disk. The first peak filter has a fixed peak frequency and a variable gain, and is configured to be inserted into a servo loop. The servo loop is configured to position the head with position error signals between servo data read by the head and a target position. The adaptive peak filter has a variable peak frequency and a variable gain, and is configured to be inserted into the servo loop. The filter controller is configured to control the gain of the adaptive peak filter according to the gain of the first peak filter.

DESCRIPTION OF THE DRAWINGS

The accompanying drawings, which are incorporated in and form a part of this specification, illustrate embodiments of the invention and, together with the description, serve to explain the embodiments of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Disk Drive and a Method for Head Servo Control of the Disk Drive With relevance to embodiments of the present invention, in order to increase the vibration resistance in head servo control, the insertion of peak filters into the servo system is known in the art. Peak filters for vibration frequencies added to a servo system increase gains for the vibration frequencies and diminish the effect of vibrations on the head servo control. There are various external disturbances depending on installation and use environments. Therefore, a servo control system includes peak filters with different peak frequencies and adjusts the gains of the peak filters to cope with external vibrations.

The installation environment of a HDD differs from one HDD to another. Thus, the exact estimation of vibration frequencies from external disturbances added to a HDD from outside is difficult. Additionally, the frequencies may vary over time. Particularly, in recent systems with many AV functions, vibrations from internal speakers are a serious issue for servo control. As a countermeasure against external vibrations, a technique using a peak filter having a variable peak frequency, which is referred to herein by the term of art, "adaptive peak filter," is known in the art. Bringing the peak frequency of a peak filter close to a frequency of external disturbances allows reducing external disturbances affecting the head positional control system.

Estimating a resonance frequency by external vibrations and setting an adaptive peak filter at an appropriate peak frequency to reduce the vibrations allows suppressing the resonance from the external vibrations, which differs from HDD system to HDD system. Additionally, a plurality of adaptive peak filters incorporated in a servo system can cope with a plurality of resonance frequencies and can provide accurate head positioning.

However, a considerable number of adaptive peak filters may be utilized to effectively cope with external vibrations, when adaptive peak filters alone are used. A lot of arithmetic operations are utilized to adjust an adaptive peak filter; and, since a HDD controller performs other various operations to control many adaptive peak filters effectively, a HDD controller, which is implemented in large scale (LSI) integrated circuits (ICs), may have difficulty performing a lot of arithmetic operations associated with an adaptive peak filter. Moreover, if a plurality of peak filters is added to a servo system in an inappropriate manner, the stability of the servo system may be impaired.

Embodiments of the present invention increase the vibration resistance of a servo system to varying external vibrations depending on the installation environment of a HDD and the use environment of a system where the HDD is installed, and yet maintain the stability of the servo system.

In accordance with embodiments of the present invention, a disk drive includes a head configured to read servo data on a disk at sampling frequency, a moving mechanism configured to hold and to move the head in proximity with the recording surface of the disk, a first peak filter with a fixed peak frequency and a variable gain configured to be inserted into a servo loop configured for positioning the head with position error signals (PESs) between servo data read by the head and a target position, an adaptive peak filter with a variable peak frequency and a variable gain configured to be inserted into the servo loop, and a filter controller configured to control the gain of the adaptive peak filter according to the gain of the first peak filter. Thus, embodiments of the present invention allow a disk drive subjected to external vibrations to perform accurate head positioning without servo system instability.

In an embodiment of the present invention, the filter controller is configured to determine the maximum acceptable gain of the adaptive peak filter according to the gain of the first peak filter. Thus, an embodiment of the present invention may provide the effect of the adaptive peak filter, while maintaining the stability of the servo system reliably.

In an embodiment of the present invention, the filter controller is configured to determine, according to external vibrations, an operation selected from the group consisting of enabling the first peak filter, disabling the first peak filter, enabling the adaptive peak filter, and disabling the adaptive peak filter. Thus, in an embodiment of the present invention, since the filters are used according to the degree of external vibration, an adverse effect can be avoided.

Moreover, in another embodiment of the present invention, the filter controller is configured to determine, according to position error signals changing with external vibrations, an operation selected from the group consisting of enabling the first peak filter, and disabling the first peak filter. Thus, in an embodiment of the present invention, as signals of a control object are used, the disk drive can accurately control the enabling, or disabling.

In another embodiment of the present invention, the disk drive further includes: a second peak filter with a peak frequency higher than the peak frequency of the first peak filter such that the second peak filter has a fixed peak frequency and a variable gain; and, a monitor peak filter with a peak frequency low than the peak frequency of the first peak filter for monitoring external vibrations such that the filter controller is configured to control the gain of the second peak filter according to output of the monitor peak filter. Thus, in an embodiment of the present invention, the filter controller allows the disk drive to perform accurate head positioning without servo system instability.

Moreover, in an embodiment of the present invention, the filter controller disables the second peak filter if the output of the monitor peak filter is over a specified value. Thus, in an embodiment of the present invention, the filter controller increases the reliability of the system.

In an embodiment of the present invention, the disk drive further includes a second peak filter with a peak frequency higher than the peak frequency of the first peak filter such that the second peak filter has a fixed peak frequency and a variable gain, and such that the filter controller is configured to control the adaptive peak filter independently of the second peak filter. Thus, embodiments of the present invention allow the disk drive to perform accurate head positioning while maintaining the stability of the servo system.

In an embodiment of the present invention, the disk drive is configured to change a data-write permission/denial condition according to a gain selected from the group consisting of the gain of the first peak filter and the gain of the adaptive peak filter. Thus, an embodiment of the present invention increases the reliability of the system.

Embodiments of the present invention also include a method for positioning a head with PESs between servo data read by the head and a target position. The method includes determining a variable gain on a servo loop and an operation selected from the group consisting of enabling a first peak filter with a fixed peak frequency, and disabling the first peak filter with the fixed peak frequency. The method also includes determining the variable gain on the servo loop and an operation selected from the group consisting of enabling an adaptive peak filter with a variable peak frequency, and disabling the adaptive peak filter with the variable peak frequency. Moreover, the method includes controlling the gain of the adaptive peak filter according to the gain of the first peak filter if enabling both the first peak filter and the adaptive peak filter on the servo loop. Thus, in accordance with embodiments of the present invention, the method allows a disk drive subjected to external vibrations to perform accurate head positioning without servo system instability.

Embodiments of the present invention provide accurate head positioning without destabilizing a servo system in a disk drive receiving external vibrations. Herein, descriptions of embodiments of the present invention are given for the environment of a HDD, as an example of a disk drive. In accordance with embodiments of the present invention, a HDD includes peak filters of different kinds in the servo system. In one embodiment of the present invention, a peak filter of one kind has a fixed peak frequency and a gain that is variable. In another embodiment of the present invention, a peak filter of another kind has a variable peak frequency and a gain that is variable. As described herein, a peak filter whose frequency and gain are variable is referred to by the term of art, "adaptive peak filter." In another embodiment of the present invention, these peak filters act to suppress vibrations caused by external disturbances in head servo control. In accordance with embodiments of the present invention, a HDD controls the gains of the peak filters in response to external vibrations and controls the gain of an adaptive peak filter according to the gain of a peak filter with a fixed peak frequency. Embodiments of the present invention allow the HDD to perform accurate head positioning according to varying external vibrations depending on the installation state and use environment, and to avoid instability of the servo system. Before describing the details of control of peak filters in a servo system according to embodiments of the present invention, the configuration of a HDD is next described.

Figure 1:
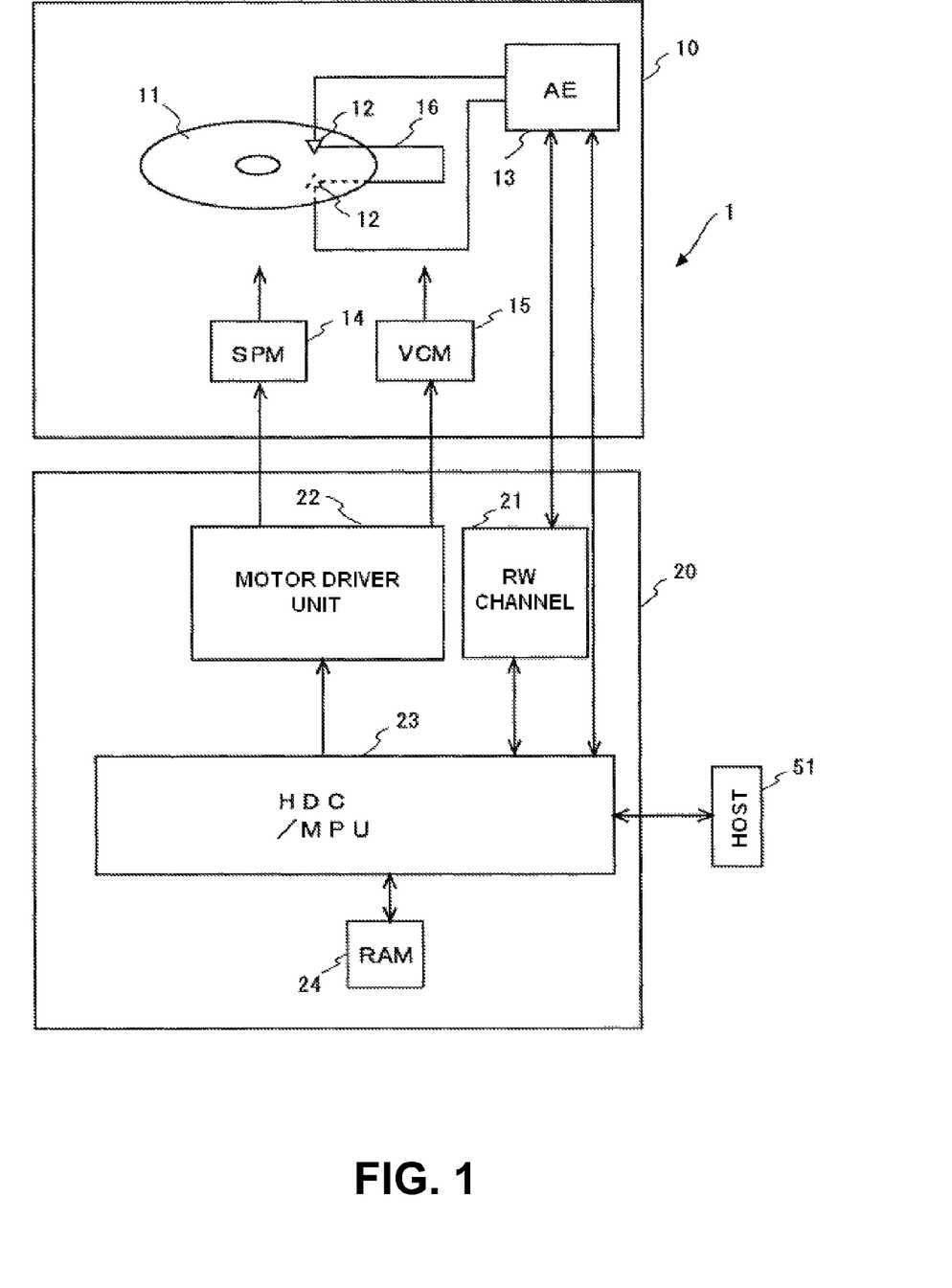
FIG. 1 is a block diagram schematically depicting a configuration of a hard-disk drive (HDD), in accordance with an embodiment of the present invention.

With reference now to FIG. 1, in accordance with an embodiment of the present invention, a block diagram is shown that schematically depicts the configuration of HDD 1. HDD 1 includes a magnetic-recording disk 11, which is a disk for storing data, in a disk enclosure (DE) 10. A spindle motor (SPM) 14 spins the magnetic-recording disk 11 at a specific angular rate. Head-sliders 12 are provided to access the magnetic-recording disk 11; each of the head-sliders 12 corresponds to each recording surface of the magnetic-recording disk 11.

Each head-slider 12 includes a slider flying in proximity to the recording surface of the magnetic-recording disk and a magnetic-recording head which is affixed on the slider and converts magnetic signals to and from electrical signals. The head-sliders 12 are affixed to a distal end of an actuator 16. The actuator 16, which is coupled to a voice coil motor (VCM) 15, rotates on a pivot shaft to move the head-sliders 12 in proximity with the recording surface of the magnetic-recording disk 11 in a nominally radial direction of the magnetic-recording disk 11.

On a circuit board 20 affixed outside DE 10, circuit elements are mounted. A motor driver unit 22 drives SPM 14 and VCM 15 in accordance with control data from a hard-disk controller/microprocessor unit (HDC/MPU) 23. A random access memory (RAM) 24 functions as a buffer for temporarily storing read data and write data. An arm-electronics (AE) module 13 inside DE 10 selects a head-slider 12 to access the magnetic-recording disk 11 from multiple head-sliders 12, amplifies read-back signals from the head-sliders 12 to send the read-back signals to a read write channel (RW channel) 21. In addition, AE module 13 sends write signals from RW channel 21 to the selected head-slider 12. Embodiments of the present invention can be applied to a HDD with only one single head-slider 12.

RW channel 21, in a read operation, amplifies read-back signals supplied from AE module 13 to have a specific amplitude, extracts data from the obtained read-back signals, and decodes the read-back signals. The read data includes user data and servo data. The decoded read user data and servo data are supplied to HDC/MPU 23. RW channel 21, in a write operation, code-modulates write data supplied from HDC/MPU 23, converts the code-modulated data into write signals, and then supplies the write signals to AE module 13.

HDC/MPU 23, which is a controller, performs control of HDD 1 in addition to processes concerning data processing such as: reading and writing operation control; command execution order management; positioning control of the head-sliders 12 using servo signals, which may be referred to herein by the term of art, "servo control;" interface control to and from a host 51; defect management; and, error handling when any error occurs. In accordance with embodiments of the present invention, head servo control is next described in detail.

Figure 2:
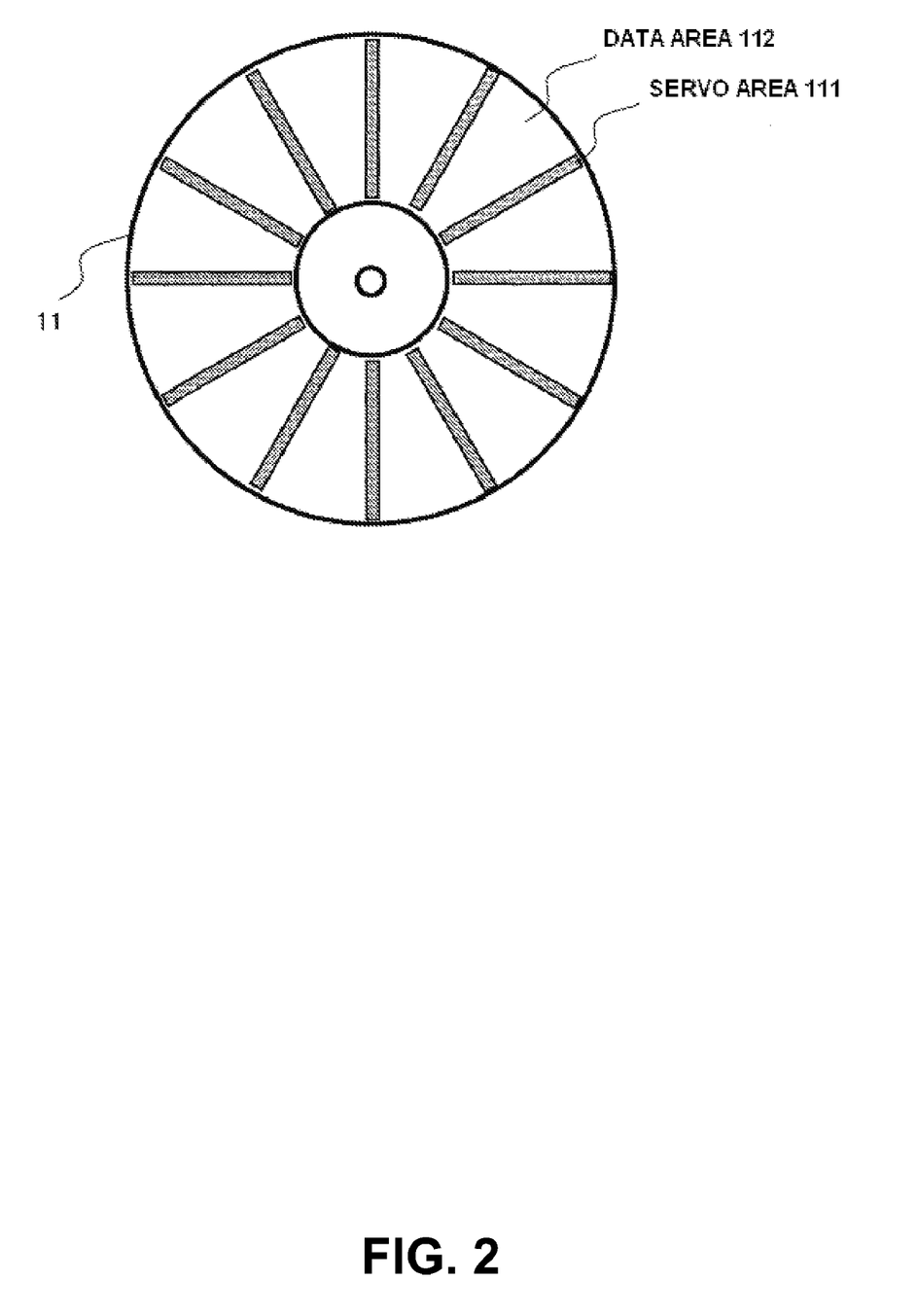
FIG. 2 is a plan view of a magnetic-recording disk schematically illustrating a data structure on a recording surface of a magnetic-recording disk, in accordance with an embodiment of the present invention.

With reference now to FIG. 2, in accordance with an embodiment of the present invention, a plan view of the magnetic-recording disk 11 is shown that schematically depicts the data structure of a recording surface of the magnetic-recording disk 11. HDC/MPU 23 performs the positioning control of a magnetic-recording head using servo data written on a recording surface of the magnetic-recording disk 11. On the recording surface of the magnetic-recording disk 11, multiple servo areas 111 extend in the radial direction from the center of the magnetic-recording disk 11 and are disposed discretely at specific angles; and, data areas 112 each are formed between two adjacent servo areas 111. In each servo area 111, servo data for performing the position control of a head-slider 12 are recorded. In each data area 112, user data are recorded.

On a recording surface of the magnetic-recording disk 11, multiple data tracks having specific width in the radial direction are formed concentrically. User data are recorded along data tracks. A data track includes a data sector as record unit of user data and typically includes multiple data sectors. Similarly, the magnetic-recording disk 11 includes multiple concentric servo tracks having specific width in the radial direction. Each servo track includes multiple servo sectors separated by a data area 112. Servo data include: a servo track number, a servo sector number in the servo track, and burst patterns for fine position control.

The burst pattern includes, for example, four kinds of burst patterns, A, B, C, and D, which are differ in their radial position. With the amplitude of read-back signals of each burst pattern, the position in the servo track can be determined. The position in the servo track can be expressed in PESs. The PES is calculated from the amplitudes of the burst patterns A, B, C, and D; and, for example, one servo track is divided into 256 PES values in the radial direction.

Upon receipt of a reading or writing command from a host, HDC/MPU 23 starts a track-seeking operation. HDC/MPU 23 moves a head-slider 12 from the current radial position to a data track indicating the address specified by the command. HDC/MPU 23 converts the address specified by the command into a servo address to locate the radial position of the target. Upon completion of the track-seeking operation, HDC/MPU 23 maintains the head-slider 12 in proximity with the target data track, in a track-following operation.

In track-seeking and track-following operations, HDC/MPU 23 uses servo data read from a recording surface of the magnetic-recording disk 11 to control the actuator 16 through VCM 15. The seek control generally controls the actuator 16 through VCM 15 by speed control and positional control using servo data. In track-following control, HDC/MPU 23 performs positioning control so that the current radial position, which is associated with the servo address, of a head-slider 12 is within a specific range from the target radial position, which is associated with the servo address. Positioning of the head-slider 12 within a specific range from the target radial position is employed in data reading and writing.

The servo areas 111 are formed discretely with substantially equal spacing in the circumferential direction on a recording surface of the magnetic-recording disk 11. Hence, in a track-following operation, a head-slider 12 reads servo data in a constant cycle, which is a servo sampling cycle; and, HDC/MPU 23 controls VCM current based on the PES indicating the position error between the current servo address indicated by the servo data and the servo address of the target. In another embodiment of the present invention, HDC/MPU 23 uses a plurality of adaptive peak filters in a track-following operation, which achieves effective suppression of head vibration caused by various external disturbances.

Figure 3:
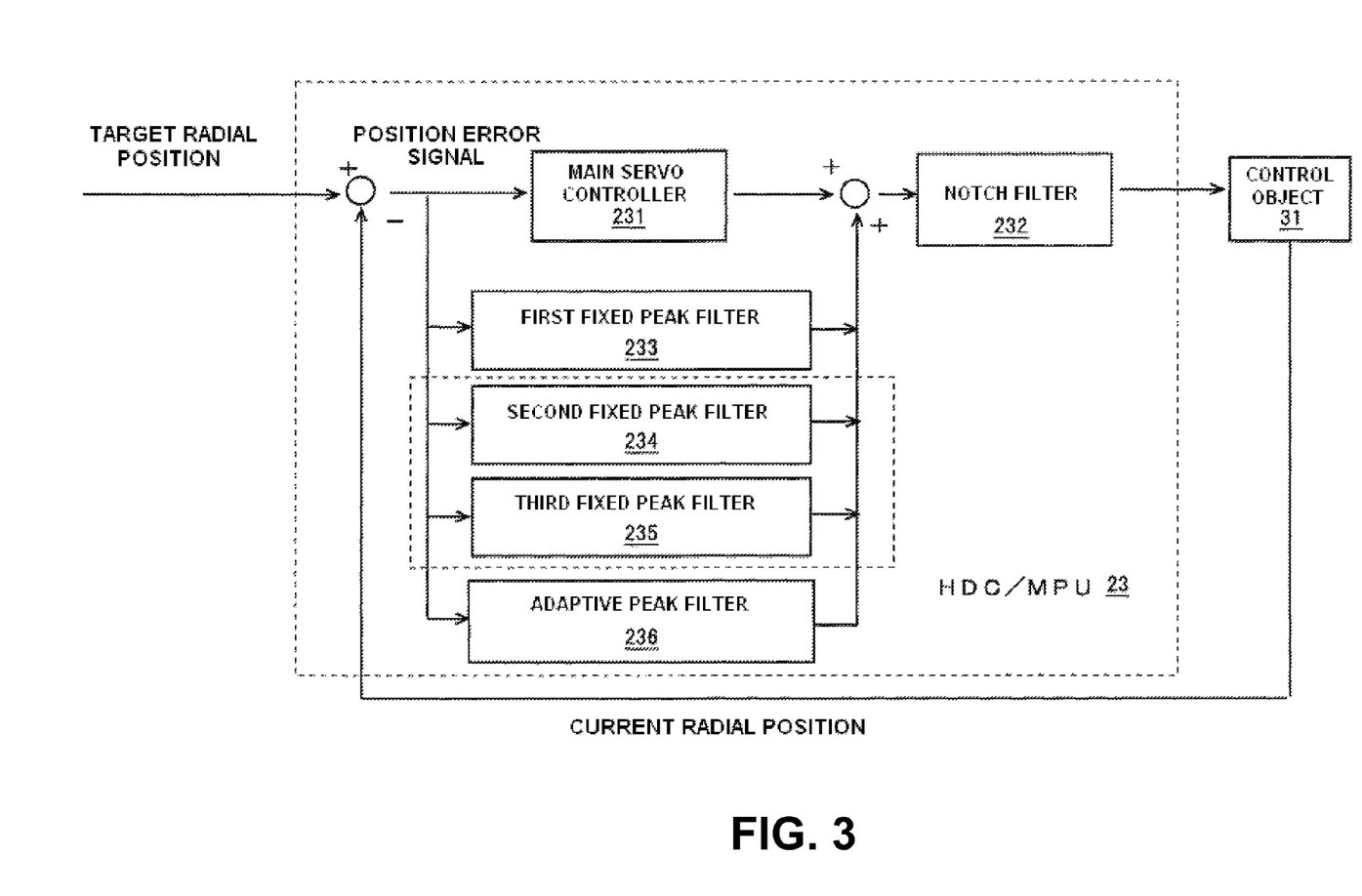
FIG. 3 is a block diagram modeling a servo control system in a HDD, in accordance with an embodiment of the present invention.

With reference now to FIG. 3, in accordance with an embodiment of the present invention, a block diagram is shown that models a servo control system in HDD 1. Each block in FIG. 3 represents a transfer function. A control object 31 in FIG. 3 is a servo control object of HDC/MPU 23, including: a motor driver unit 22, a VCM 15, an actuator 16, and head-sliders 12. The manipulated variable for the control object 31 is control data from HDC/MPU 23 to the motor driver unit 22 which represents the VCM current. Feedback from the control object 31 is the signal indicating the current radial position of the magnetic-recording head determined from servo data read by the head-slider 12.

The servo control system in HDC/MPU 23 includes: a main servo controller 231, a notch filter 232, and a plurality of peak filters 233 to 236. The plurality of peak filters 233 to 236 are peak filters to be added to the servo system when external vibrations exist; and, the plurality of peak filters 233 to 236 are off the servo system, which is the same as a state where the gains are set at 0, when frequency components to be coped with in external vibrations are less than threshold levels. In this configuration, the servo system includes three fixed peak filters 233, 234 and 235 whose peak frequencies are fixed and one adaptive peak filter 236 whose peak frequency is variable.

Figure 4:
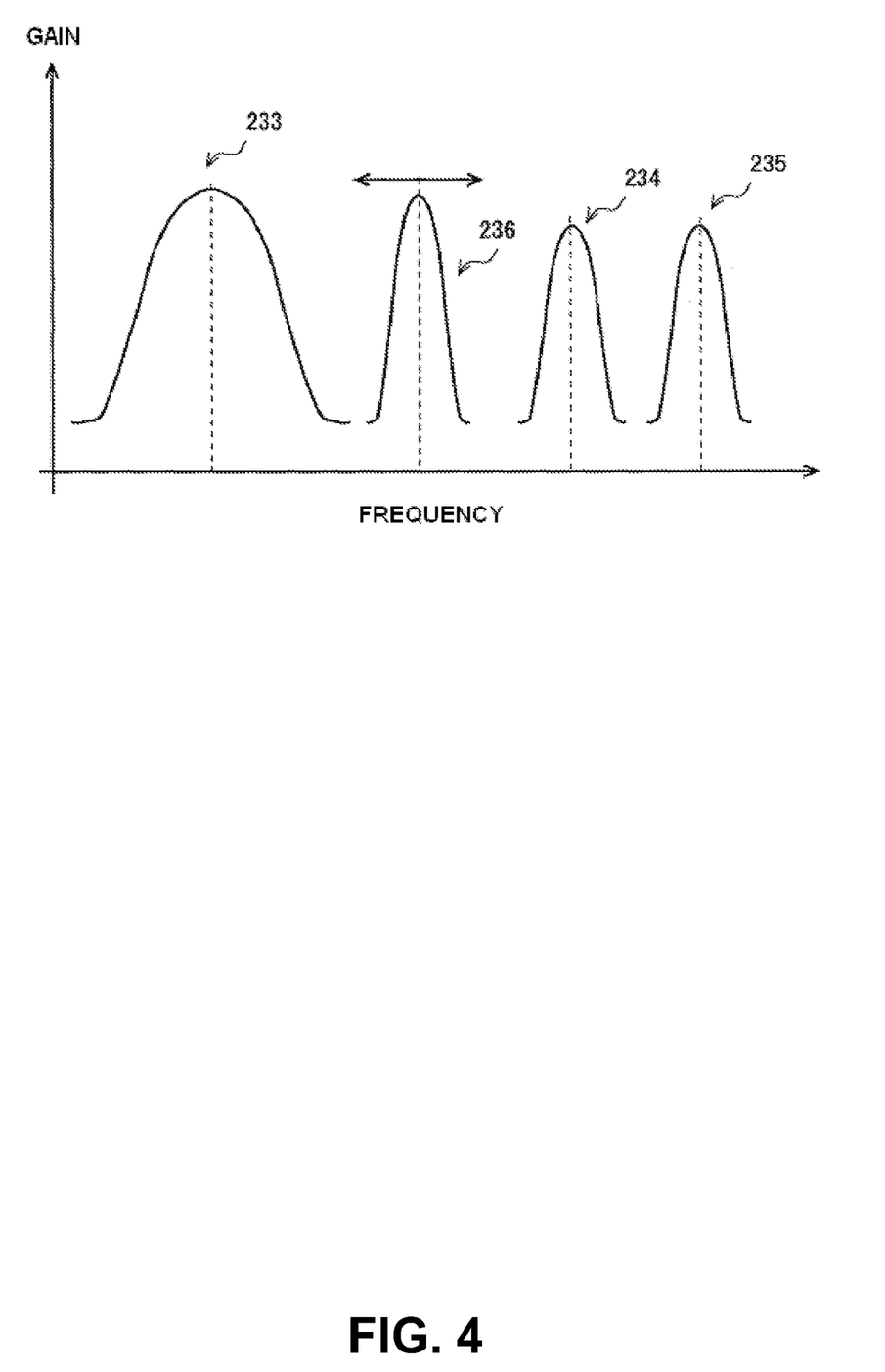
FIG. 4 is a graph that depicts an example of a configuration with fixed peak filters and an adaptive peak filter in operation, in accordance with an embodiment of the present invention.

With reference now to FIG. 4, in accordance with an embodiment of the present invention, a graph is shown that depicts an example of a configuration with the peak filters 233 to 236 in operation. The first, second and third fixed peak filters 233, 234 and 235 have fixed peak frequencies and variable gains. The peak frequency of the first peak filter 233 is the lowest; the peak frequency of the third peak filter 235 is the highest; and, the peak frequency of the second peak filter 234 is between the peak frequencies of the first peak filter 233 and the third peak filter 235. The peak frequency and the gain of the adaptive peak filter 236 change depending on the frequency of external vibrations.

The servo system may have only one fixed peak filter, or alternatively, more than three fixed peak filters. The servo system may also include multiple adaptive peak filters. For clarity of description, a servo system which adds peak filters illustrated in FIG. 3 and FIG. 4 to the servo loop is next described. Typically, functional components depicted in FIG. 3 are implemented in hardware in HDC/MPU 23, but a portion of the functions may be carried out by computations of the MPU. Thus, in an embodiment of the present invention, the peak filters 233 to 236 and a notch filter 232 are configured as hardware to perform operations without lag.

The main servo controller 231 calculates, in other words, provides control data indicating, the VCM current in accordance with PESs. The control by the main servo controller 231 is basically proportional-integral-derivative (PID) control; and, handling high vibrations of a head-slider 12, which is attached to the actuator 16, with stable control may be difficult. Then, HDC/MPU 23 includes the notch filter 232 arranged serially with the main servo controller 231 and peak filters 233 to 236 connected in parallel.

The notch filter 232 mainly acts to suppress resonance of the actuator 16. Reducing the component corresponding to a resonance frequency of the actuator 16 in signals from the main servo controller 231 allows suppressing high vibration at the resonance frequency of the actuator 16. HDC/MPU 23 includes one or more notch filters. FIG. 3 exemplifies a single notch filter 232. The notch filter 232 may be omitted, if not indicated by the design.

The peak filters 233 to 236 act to suppress vibration of a head-slider 12, which is attached to the actuator 16, caused by external disturbances. External vibrations applied to HDD 1 include components depending on the installation state of HDD 1. For example, the external vibrations applied to HDD 1 may include: vibration from other disk drives disposed in the system such as a HDD and an optical disk drive, as well as vibration caused by a rotating cooling fan. Although such vibration appears and disappears, the frequency components do not vary significantly, unlike vibration from speakers. The first, second and third fixed peak filters 233, 234 and 235 change the gain values to handle such vibration. The first, second and third fixed peak filters 233 to 235 may also suppress the main vibration component from speakers.

In contrast, the adaptive peak filter 236 acts to suppress vibration with inconstant frequency caused by external vibrations. For example, such external vibrations may be generated by a speaker. HDD 1 changes the peak frequency of the adaptive peak filter 236 in response to varying external vibrations in the servo control of a head-slider 12. The peak filters 233 to 236 as a whole affect the gain in the servo system and each peak filter is not associated with a specific vibration source, such as a speaker or a cooling fan.

In FIG. 3, from servo data read by a head-slider 12 included in the control object 31, HDC/MPU 23 creates data, in the form of a signal, indicating the current radial position of the head-slider 12. HDC/MPU 23 contains data indicating the target radial position specified by a command from the host 51. HDC/MPU 23 calculates a PES, which is a form of data, which is the difference between the target radial position and the current radial position.

The main servo controller 231 performs specific computations on the PESs to figure out the VCM current value to bring the head-slider 12 close to the target radial position, so as to suppress the position error. The PESs are also input to the plurality of peak filters 233 to 236 connected in parallel with the main servo controller 231. Each of the peak filters 233 to 236 includes a filter waveform which possesses the maximum gain at the peak frequency and drastically decreases the gain with increasing departure from the peak frequency. Hence, a specific frequency component in the PESs is the filter output.

The outputs of the peak filters 233 to 236 are added to the output of the main servo controller 231, and the addition result, in the form of a signal, is applied to the notch filter 232. The peak filters 233 to 236 have been adapted to external vibrations so that the peak filters 233 to 236 can effectively suppress head vibration caused by vibration received from an external disturbance. In addition to those peak filters, HDD 1 may have peak filters for repeatable run-out (RRO) of the magnetic-recording disk 11. As to a position error caused by an external disturbance with constant frequencies, such as RRO, for example, a low frequency of N-times the rotational frequency of the magnetic-recording disk 11, where N is 1, 2, 3, . . . , peak filters with appropriate peak frequencies to the constant frequencies can effectively suppress the position error.

Suppression of the effect of external vibrations and stable servo control are employed in servo control in head positioning. Thus, HDC/MPU 23 changes the gain of the adaptive peak filter 236 according to the gain of a fixed peak filter, as well as external vibrations. The control of the peak filters 233 to 236 is next described.

Figure 5:
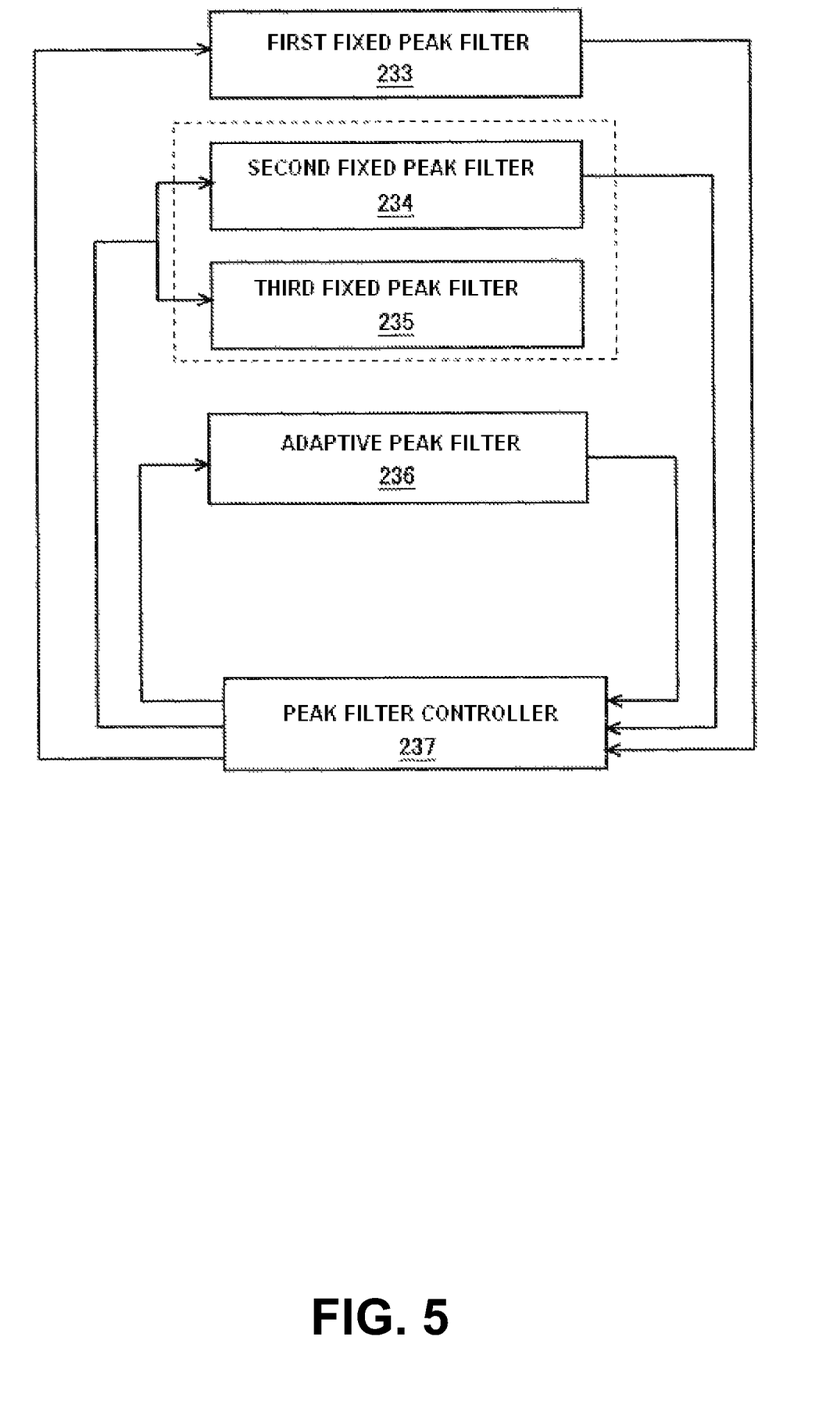
FIG. 5 is a block diagram schematically illustrating peak filters added in response to external vibrations and the configuration associated with control of the peak filters, in accordance with an embodiment of the present invention.

With reference now to FIG. 5, in accordance with an embodiment of the present invention, a block diagram is shown that schematically illustrates the peak filters 233 to 236 added in response to external vibrations and the configuration associated with the control of the peak filters. The filter controller 237 determines: whether the peak filters 233 to 236 are inserted into the servo loop or not, in other words, whether the peak filters 233 to 236 are enabled, or disabled; controls the gains of the fixed peal filters 233, 234 and 235; and, controls the gain and the peak frequency of the adaptive peak filter 236. Disabling the peak filters 233 to 236 has the same meaning as setting their gain values at 0.

In one embodiment of the present invention, the peak filters 233 to 236 are inserted into the servo loop only if external vibrations are so strong that the insertion would reduce the effects of external vibrations. The filter controller 237 obtains the output from the first fixed peak filter 233 and if the output is larger than a specified value, the filter controller 237 adds the first fixed peak filter 233 to the servo loop. The output from the first fixed peak filter 233 indicates the magnitude of the component of the peak frequency in the vibration of the head-slider 12. Thus, referring to the output of the first fixed peak filter 233 allows measuring the vibration intensity of the corresponding frequency.

In the configuration shown in FIG. 5, the second fixed peak filter 234 and the third fixed peak filter 235 are grouped together; and, the filter controller 237 controls the second fixed peak filter 234 and the third fixed peak filter 235, simultaneously. Thus, the filter controller 237 provides efficient control. Specifically, the filter controller 237 obtains the output of the second fixed peak filter 234 and inserts the two fixed peak filters 234 and 235 into the gain loop if the obtained value is over a specified value. Alternatively, the filter controller 237 may refer to the output of any of the peak filters and control the peak filters 234 and 235, individually.

The peak frequency of the adaptive peak filter 236 is not constant. Therefore, the filter controller 237 calculates the moving average of square values of the present and past consecutive PESs and the squared value of the variance, which is known by the term of art, "sigma," of the PES, which shows the stability of the head-slider. If the value is over a threshold level, the filter controller 237 inserts the adaptive peak filter 236 into the gain loop.

The filter controller 237 controls the gain of the first fixed peak filter 233 according to the PES. If the gain is increased, the PES is decreased. Typically, the filter controller 237 adjusts the gain in such a manner that the PES is smaller than a threshold level. The settable maximum gain is specified; and, the filter controller 237 set a gain value less than the maximum value to the first fixed peak filter 233.

Similarly, the filter controller 237 controls the gains of the second and the third fixed peak filters 234 and 235 according to the output of the second fixed peak filters 234. Typically, the filter controller 237 sets the same gain value to the second and the third fixed peak filters 234 and 235. However, alternatively, the filter controller 237 may set the gains at different values.

The filter controller 237 obtains an internal variable of the adaptive peak filter 236, estimates a resonance frequency and the intensity of external vibrations from the obtained value, and controls the peak frequency and the gain. There are some ways to adapt the adaptive peak filter 236 to external vibrations. Thus, embodiments of the present invention may be applied to HDDs using any of a variety of adaptation processes.

In an embodiment of the present invention, the filter controller 237 controls the gain of the adaptive peak filter 236 according to the gain of a fixed peak filter. Thus, in an embodiment of the present invention, the filter controller 237 avoids instability of servo system that uses an adaptive peak filter and a fixed peak filter. In another embodiment of the present invention, the filter controller 237 controls the gains of the second and the third fixed peak filters 234 and 235, in addition to, the adaptive peak filter 236 according to external vibrations whose frequency corresponds to the fixed peak filter 233. Thus, the filter controller 237 increases stability of servo system.

In another embodiment of the present invention, the filter controller 237 controls the gain of the adaptive peak filter 236 on the basis of the gain of the fixed peak filter 233 with the lowest peak frequency. The research of the inventors has found that lower frequency components in external vibrations affect more significantly the head servo control in a HDD. Thus, if the first fixed peak filter 233 to suppress low-frequency vibrations has higher priority than the other peak filters, more precise head positioning is provided. For one embodiment of the present invention, as shown in FIG. 4, the lower-frequency fixed peak filter 233 is broader than the second and third peak filters 234 and 235 for higher frequencies.

The lower-frequency fixed peak filter 233 is broader than the second and third peak filters 234 and 235 for higher frequencies, because low-frequency vibrations tend to affect a wider frequency range than high-frequency vibrations and high-frequency vibrations tend to have a narrow frequency range. The broader a peak filter, the greater the effect of the peak filter on vibrations with other frequencies. The combined application of the first fixed peak filter 233 and the other peak filters is apt to cause instability of the servo loop. In another embodiment of the present invention, since the adaptive peak filter 236 changes the peak frequency in response to external vibrations, the width is narrowed similar to high-frequency peak filters. Depending on design, another peak filter, for example, a fixed or adaptive peak filter, different from the lowest-frequency peak filter may be used as the reference.

The filter controller 237 may control the gains of the peak filters 234 and 235 and 236 in diverse ways. In one way, the filter controller 237 determines the gains of the peak filters 234, 235 and 236 by a usual adaptation process, and subsequently readjusts the gains of the peak filters 234, 235 and 236. For example, the filter controller 237 subtracts a specified ratio of the determined gain of the first fixed peak filter 233 from the determined gains. Otherwise, the filter controller 237 controls an "ON/OFF" state of the peak filters 234, 235 and 236. For example, if the gain of the first fixed peak filter 233 is beyond a specified range, the filter controller 237 disables the peak filters 234, 235 and 236, which is the same as controlling the gains to be set at 0.

In another way, the filter controller 237 changes the maximum acceptable gains of the peak filters 234, 235 and 236. For example, the filter controller 237 decreases the maximum acceptable gains of the peak filters 234, 235 and 236 with an increase in the gain of the first fixed peak filter 233. The filter controller 237 may use different methods for individual peak filters.

In accordance with embodiments of the present invention, a configuration is next described where the filter controller 237, according to the gain of the first fixed peak filter, disables the second and the third fixed peak filters 234 and 235, and further changes the maximum acceptable gain of the adaptive peak filter 236. The filter controller 237 can reliably avoid instability of the servo loop caused by the effect of the second and the third fixed peak filters 234 and 235 by setting the gains of the second and the third fixed peak filters 234 and 235 at 0.

On the other hand, the adaptive peak filter 236 changes the peak frequency according to existing external vibrations. Thus, in accordance with embodiments of the present invention, a balance is struck between stability of the servo system and accurate servo control by suppressing external vibrations. Therefore, the filter controller 237 reduces the maximum acceptable gain of the adaptive peak filter 236 with an increase in the gain of the first fixed peak filter 233. The filter controller 237 may refer to the gain of the first fixed peak filter 233 for the gain control of the peak filters 234 to 236 or refer to the output of a monitor peak filter implemented for monitoring external vibrations frequencies corresponding to the gain of the fixed peak filter.

Figure 6:
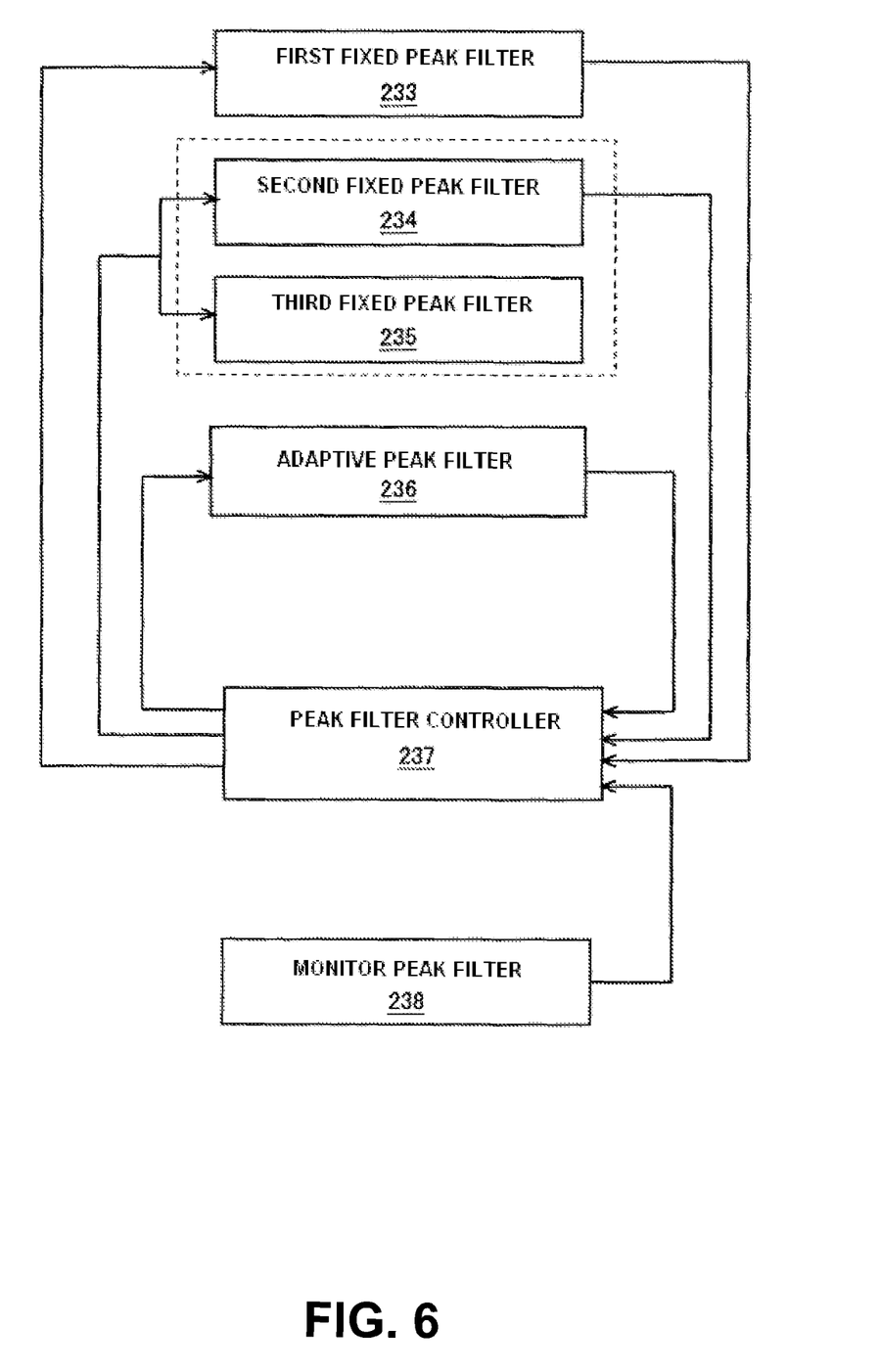
FIG. 6 is a block diagram schematically illustrating peak filters added in response to external vibrations, a monitor peak filter of external vibrations, and the configuration associated with control of the peak filters, in accordance with an embodiment of the present invention.

With reference now to FIG. 6, in accordance with an embodiment of the present invention, a block diagram is shown that schematically depicts peak filters added in response to external vibrations, a monitor peak filter of external vibrations, and the configuration associated with control of the peak filters. As shown in FIG. 6, the monitor peak filter 238 is outside the servo loop and used only for monitoring a specific frequency range of vibrations. The monitor peak filter 238 monitors low-frequency vibration and the output corresponds to the gain of the first fixed peak filter 233. The filter controller 237 refers to the output of the monitor peak filter 238 to perform the gain control of the peak filters 234 to 236 according to the gain of the first fixed peak filter 233.

Figure 7:
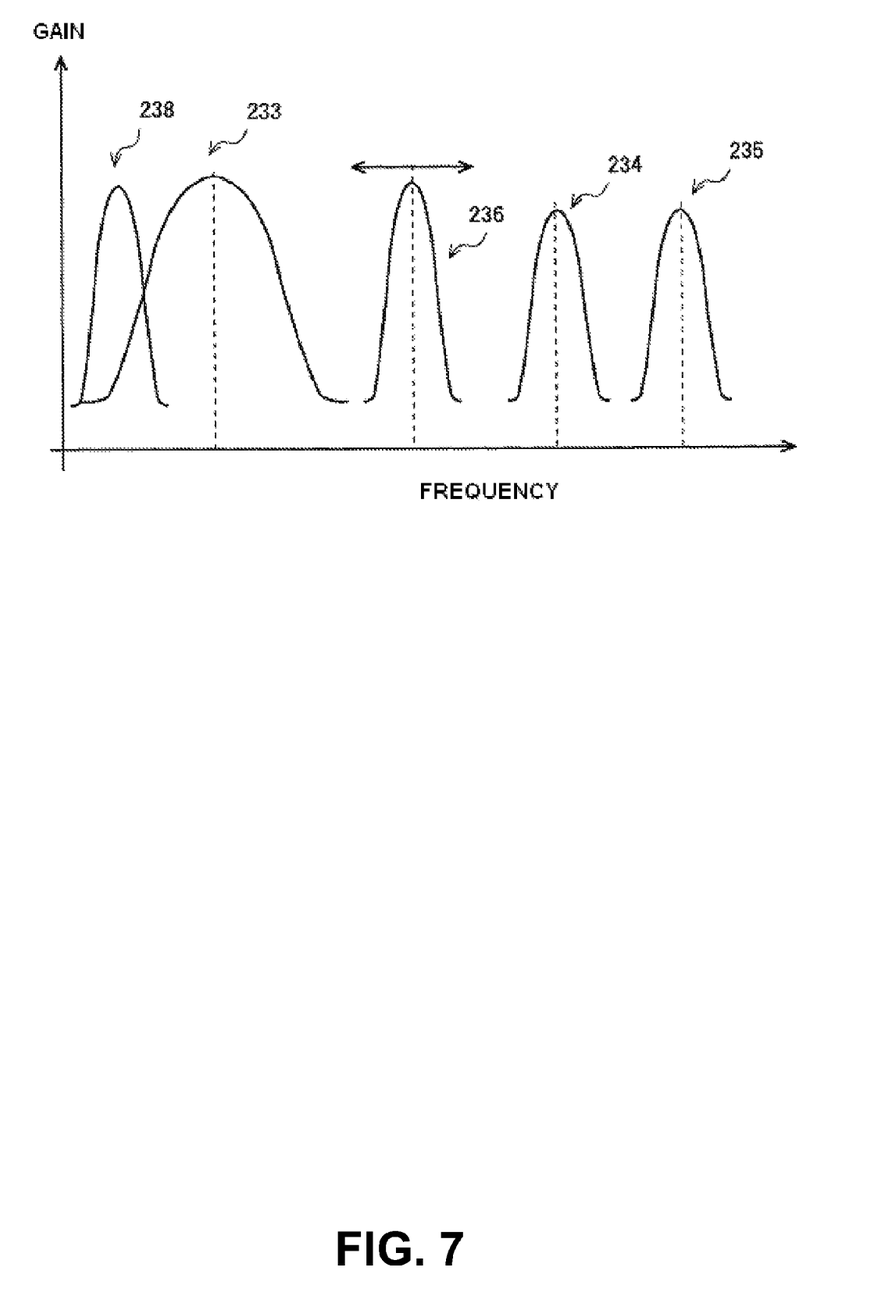
FIG. 7 is a graph that depicts an example of a configuration with fixed peak filters, an adaptive peak filter, and a monitor peak filter in operation, in accordance with an embodiment of the present invention.

With reference now to FIG. 7, in accordance with an embodiment of the present invention, a graph is shown that depicts an example of a configuration with fixed peak filters, an adaptive peak filter, and a monitor peak filter in operation. As shown in FIG. 7, for the purpose of the monitor peak filter 238, the peak frequency of the monitor peak filter 238 is closer to the peak frequency of the first fixed peak filter than the second and the third fixed peak filters; or alternatively, the peak frequency of the monitor peak filter 238 is the closest to the peak frequency of the first fixed peak filter among the fixed peak filters; and, in another embodiment of the present invention, the peak frequency of the monitor peak filter 238 is lower than the peak frequency of the first fixed peak filter 233. The filter controller 237 disables the second and the third fixed peak filters 234 and 235 if the output of the monitor peak filter 238 is greater than a specified threshold level.

In an embodiment of the present invention, the filter controller 237 refers directly to the gain of the first fixed peak filter 233 for controlling the gain of the adaptive peak filter 236. As described above, the filter controller 237 changes the gain of the adaptive peak filter 236, instead of disabling the adaptive peak filter 236. Thus, if the filter controller 237 refers directly to the gain of the first fixed peak filter 233, the filter controller 237 can adjust the gain value of the adaptive peak filter 236 more precisely.

Figure 8:
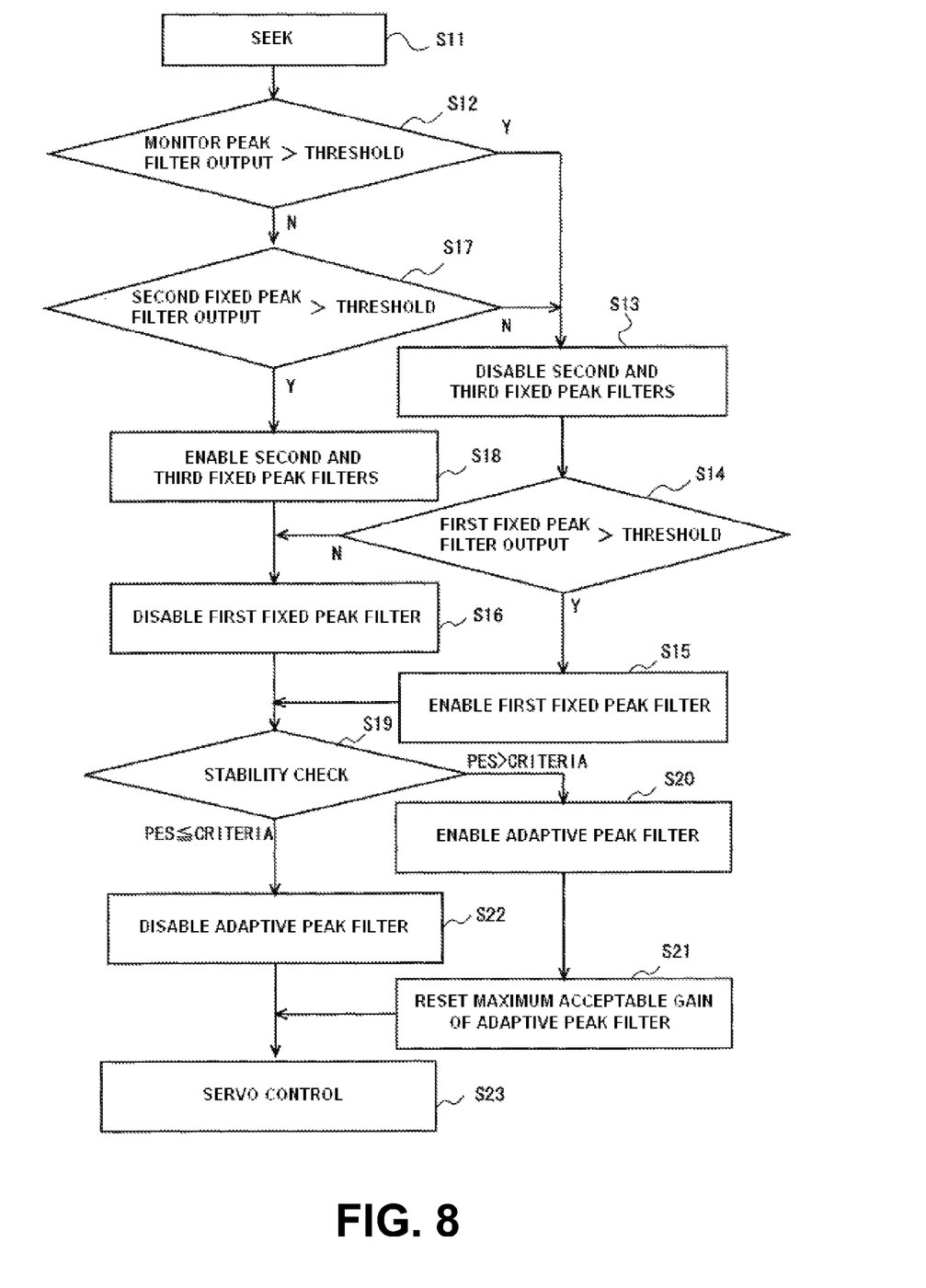
FIG. 8 is a flowchart showing an example of a control process performed by a filter controller, in accordance with an embodiment of the present invention.

With reference now to FIG. 8, in accordance with an embodiment of the present invention, a flowchart is shown that depicts the control process by the filter controller 237. HDC/MPU 23 moves the head-slider, which is attached to the actuator 16, to a designated target track, which is a track-seeking operation, at S11. In the track-seeking operation, the peak filters 223 to 236 are disabled. If a track-following operation starts at the target position, the filter controller 237 refers to the output of the monitor peak filter 238, at S12.

If the output of the monitor peak filter 238 is greater than a specified threshold level (Y-branch after S12), the filter controller 237 disables the second fixed peak filter 234 and the third fixed peak filter 235, at S13. The filter controller 237 refers to the output of the first fixed peak filter 233, at S14; and, if the value is beyond a specified threshold level (Y-branch after S14), the filter controller 237 enables the first fixed peak filter 233, at S15. If the output of the first fixed peak filter 233 is no more than the threshold level (N-branch after S14), the filter controller 237 disables the first fixed peak filter 233, which maintains the off state, at S16.

After S12, if the output of the monitor peak filter 238 is no more than the specified threshold level (N-branch after S12), the filter controller 237 refers to the output of the second fixed peak filter 234, at S17; and, if the value is greater than a specified threshold level (Y-branch after S17), the filter controller 237 enables the second and the third fixed peak filters 234 and 235, at S18. If the output of the monitor peak filter 238 is no more than the specified threshold level, the first fixed peak filter 233 may not be utilized.

Thus, the filter controller 237 disables the first fixed peak filter 233, which maintains the off state, at S16. Thus, in an embodiment of the present invention, the operation of the first fixed peak filter 233 is assigned higher priority and the first fixed peak filter 233 does not operate together with the second and the third fixed peak filters in the servo loop. If the output of the second peak filter 234 is no more than the threshold level (N-branch after S17), the filter controller 237 disables the second and the third fixed peak filters 234 and 235, at S13.

Subsequently, the filter controller 237 calculates the head stability from the PES, for example, the moving average of squares of PESs, at S19. If the head stability is worse than a specified criterion, in other words, over a threshold level, (PES>CRITERIA in S19), the filter controller 237 enables the adaptive peak filter 236 to put the adaptive peak filter 236 into operation in the servo loop, at S20.

Furthermore, the filter controller 237 determines the maximum acceptable value of the adaptive peak filter 236 from the gain of the first fixed peak filter 233, at S21. For example, the filter controller 237 resets the value obtained by subtracting the gain of the first fixed peak filter 233 from the preset maximum acceptable value as the new maximum acceptable value of the adaptive peak filter 236. A value representing a gain may not be the gain value itself, but may alternatively be a value indicating a gain level. Subsequently, at S23, the servo control is performed depending on the determined setting.

If the head stability falls within the specified range, in other words, no more than the threshold level, (PES≦CRITERIA in S19), the filter controller 237 disables the adaptive peak filter 236, which maintains the off state, at S22. Subsequently, at S23, the servo control is performed depending on the determined setting. The above-described process allows the filter controller 237 to use different types of peak filters, a fixed peak filter and an adaptive peak filter, in head positioning, and to perform more accurate positioning of the head-slider according to external vibrations while maintaining the stability of the servo loop.

The effective use of different types of peak filters provides more accurate positioning of the head-slider 12 in response to external vibrations. However, the full suppression of the effects of increased external vibrations on the positioning accuracy of the head-slider 12 is very difficult, if not impossible. Therefore, in accordance with an embodiment of the present invention, the write controller in HDC/MPU 23 changes the write inhibit condition, which is the condition for permission/denial of writing.

The write inhibit condition is a condition to determine permission and denial for data writing onto the magnetic-recording disk 11 with a head-slider 12. Specifically, for example, condition elements are: the difference between the current position and the target position; the change rate of position of the magnetic-recording head; and, the estimated difference between the position of the magnetic-recording head and the target position at the next sampling. The difference between the current position and the target position can be represented by the PES. The change rate of position of the magnetic-recording head can be represented by the difference between the PES of the previous sampling and the current PES. The estimated difference can be represented by the value obtained by adding the current difference to the rate of change of position of the magnetic-recording head.

In another embodiment of the present invention, HDC/MPU 23 changes the write inhibit condition according to the output of a peak filter. Thus, embodiments of the present invention allow setting the write inhibit condition appropriately in an efficient process. In accordance with an embodiment of the present invention, the write controller resets the write inhibit condition from the normal condition to a condition affected by an external condition if any of the peak filters 233 to 236 is operating, under circumstances in which the gain is more than 0 in the servo loop. Otherwise, the write controller refers to the output of a specific peak filter and compares the value to a specified value to determine the write inhibit condition. In either case, the write controller restricts the write inhibit condition under external vibrations. Thus, in an embodiment of the present invention, the write controller prevents off-track writing more effectively.

For example, the ordinary write inhibit condition is determined by the inequalities: the deference>40 PES, the difference rate>40 PES, and the estimated difference>50 PES. If one of these inequalities is satisfied, the write controller inhibits, in other words, suspends, data writing. On the other hand, the write inhibit condition under external vibrations is determined by the inequalities: the deference>30 PES, the difference rate>30 PES, and the estimated difference>40 PES. If all expressions are restricted, or more than half of the expressions are restricted, including the first one, the write inhibit condition is more restricted as a whole.

As set forth above, embodiments of the present invention have been described by way of examples; but, embodiments of the present invention are not limited to the above-described examples and can of course be modified in various ways within the spirit and scope of embodiments of the present invention. For example, embodiments of the present invention can be applied to disk drives with data-storage disks other than magnetic-recording disks, or alternatively, with removable disks of diverse types.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive comprising:
   a head configured to read servo data on a disk at sampling frequency;
   a moving mechanism configured to hold and to move said head in proximity with a recording surface of said disk;
   a first peak filter with a fixed peak frequency and a variable gain configured to be inserted into a servo loop, said servo loop configured to position said head with position error signals between servo data read by said head and a target position;
   an adaptive peak filter with a variable peak frequency and a variable gain configured to be inserted into said servo loop; and
   a filter controller configured to control said gain of said adaptive peak filter according to said gain of said first peak filter.

2. The disk drive of claim 1, wherein said filter controller is configured to determine a maximum acceptable gain of said adaptive peak filter according to said gain of said first peak filter.

3. The disk drive of claim 1, wherein said filter controller is configured to determine, according to external vibrations, an operation selected from the group consisting of enabling said first peak filter, disabling said first peak filter, enabling said adaptive peak filter, and disabling said adaptive peak filter.

4. The disk drive of claim 3, wherein said filter controller is configured to determine, according to position error signals changing with external vibrations, an operation selected from the group consisting of enabling said first peak filter, and disabling said first peak filter.

5. The disk drive of claim 1, further comprising:
   a second peak filter with a peak frequency higher than said peak frequency of said first peak filter, said second peak filter having a fixed peak frequency and a variable gain; and
   a monitor peak filter with a peak frequency lower than said peak frequency of said first peak filter, said monitor peak filter configured to monitor external vibrations;
   wherein said filter controller is configured to control said gain of said second peak filter according to output of said monitor peak filter.

6. The disk drive of claim 5, wherein said filter controller is configured to disable said second peak filter if said output of said monitor peak filter is over a specified value.

7. The disk drive of claim 1, further comprising:
   a second peak filter with a peak frequency higher than said peak frequency of said first peak filter, said second peak filter having a fixed peak frequency and a variable gain;
   wherein said filter controller is configured to control said adaptive peak filter independently of said second peak filter.

8. The disk drive of claim 1, wherein said disk drive is configured to change a data-write permission/denial condition according to a gain selected from the group consisting of said gain of said first peak filter, and said gain of said adaptive peak filter.

9. A method for positioning a head with position error signals between servo data read by said head and a target position, said method comprising:

determining a variable gain on a servo loop and an operation selected from the group consisting of enabling a first peak filter with a fixed peak frequency, and disabling said first peak filter with said fixed peak frequency;

determining said variable gain on said servo loop and an operation selected from the group consisting of enabling a adaptive peak filter with a variable peak frequency, and disabling said adaptive peak filter with said variable peak frequency; and controlling said gain of said adaptive peak filter according to said gain of said first peak filter if enabling both said first peak filter and said adaptive peak filter on said servo loop.

10. The method of claim 9, further comprising:
determining a maximum acceptable gain of said adaptive peak filter according to said gain of said first peak filter.

11. The method of claim 9, further comprising:
determining, according to output of said first peak filter, an operation selected from the group consisting of enabling said first peak filter, and disabling said first peak filter.

12. The method of claim 9, further comprising:
determining, according to output of a monitor peak filter with a peak frequency lower than said peak frequency of said first peak filter for monitoring external vibrations, said variable gain on said servo loop; and determining an operation selected from the group consisting of enabling a second peak filter with a fixed peak frequency higher than said peak frequency of said first peak filter, and disabling said second peak filter with said fixed peak frequency higher than said peak frequency of said first peak filter.

13. The method of claim 12, further comprising:
disabling said second peak filter if said output of said monitor peak filter is over a specified value.

14. The method of claim 9, further comprising:
determining said variable gain on said servo loop and an operation selected from the group consisting of enabling a second peak filter with a fixed peak frequency higher than said peak frequency of said first peak filter, and disabling said second peak filter with said fixed peak frequency higher than said peak frequency of said first peak filter; and controlling said adaptive peak filter independently of said second peak filter.

15. The method of claim 9, further comprising:
changing a data-write permission/denial condition according to a gain selected from the group consisting of a gain of said first peak filter, and a gain of said adaptive peak filter.

* * * * *